Patented Feb. 5, 1952

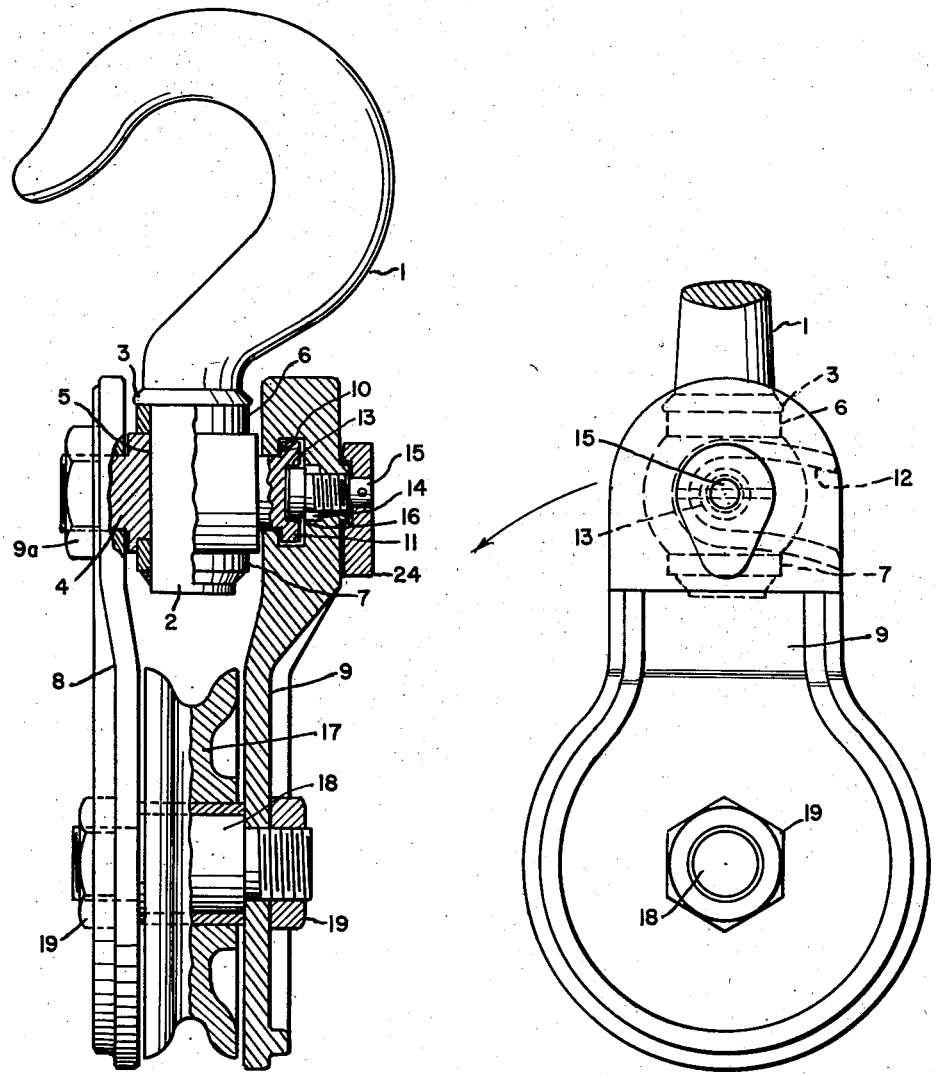

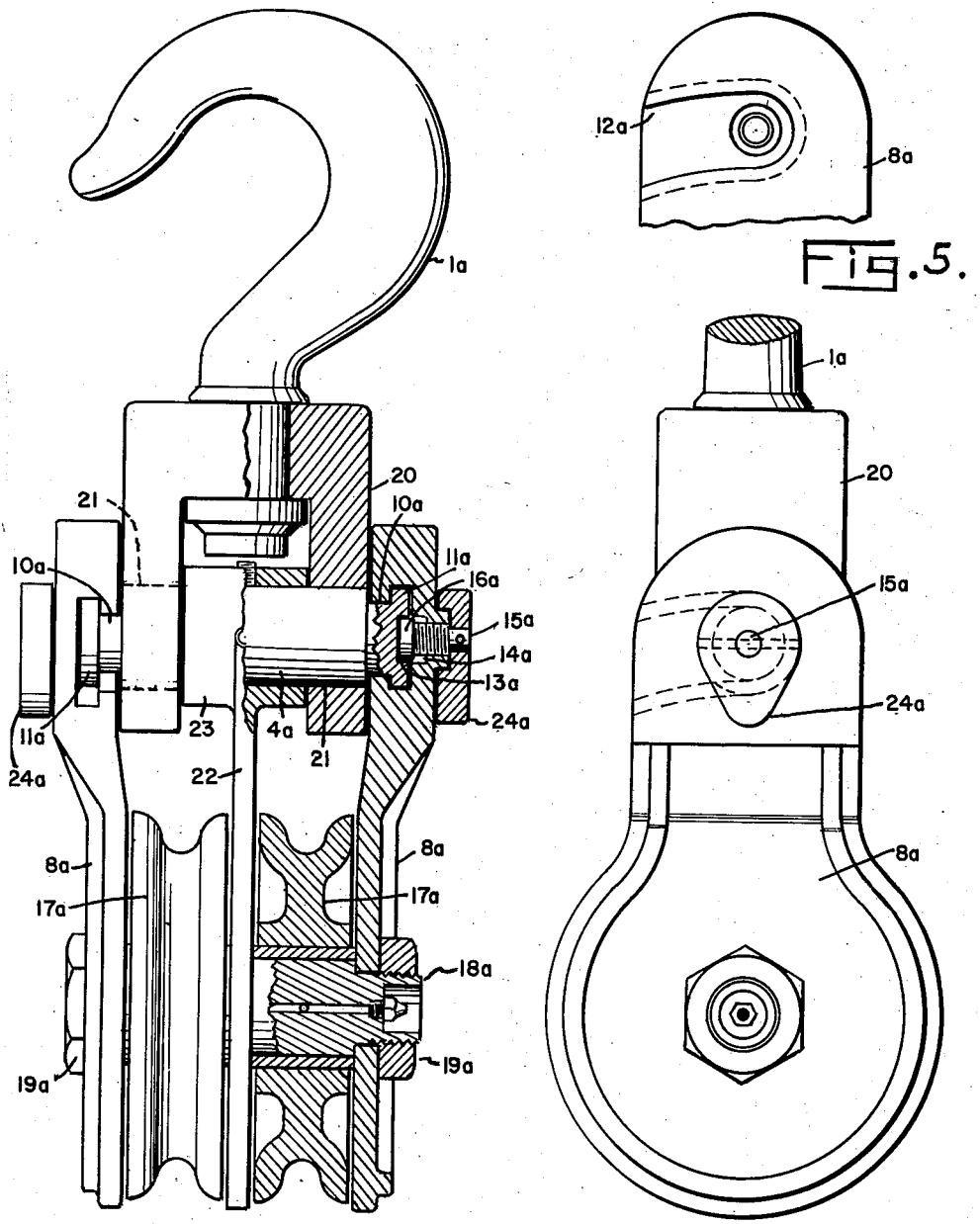

2,584,783

UNITED STATES PATENT OFFICE 2,584,783

SNATCH BLOCK

O. Magnus Berg, Houston, Tex.

Application March 4, 1948, Serial No. 12,990

1 Claim. (Cl. 254—193)

This invention relates to a snatch block.

An object of the invention is to provide a snatch block of the character described whose frame is of such construction that the cable employed may be readily applied to, or removed from, the sheave or sheaves without threading the cable through the block.

It is another object of the invention to provide a snatch block of the character described having a spindle supported hook with sheave supporting side plates suspended therefrom with one of the side plates, adjacent a sheave, readily detachable from the corresponding end of the spindle so as to allow a loop of the cable to be readily applied to, or removed from, the adjacent sheave.

The invention further embodies novel means for securing said detachable side plate to the spindle, said securing means being readily releasable to detach said said plate from the corresponding end of the spindle.

Other objects and advantages will be apparent from the following specifications which is illustrated by the accompanying drawings, wherein:

Figure 1 is a side view, partly in section, of a single sheave type of snatch block.

Figure 2 is an elevational view thereof.

Figure 3 is an elevational view of a type of snatch block embodying two sheaves.

Figure 4 is a side view thereof, partly in section, and

Figure 5 is a fragmentary, inside view of the upper end of a side plate employed.

Referring now more particularly to the drawings wherein like numerals of reference designate the same parts in each of the figures, the numeral 1 designates a supporting hook having a shank 2 provided with an annular shoulder 3 spaced from its free end.

The numeral 4 designates a transverse spindle having a vertical bearing 5 through which the shank works.

There is a spacer ring 6 between the shoulder 3 and the spindle and which surrounds the shank.

Surrounding the free end of the shank and preferably countersunk into the spindle there is an annular spacer ring 7 which is welded to said shank.

The hook 1 may thus rotate on a vertical axis.

In the form shown in Figures 1 and 2 there are the side plates 8 and 9.

One end of the spindle 4 is reduced in diameter and fitted through an opening in the side plate 8 and externally threaded to receive a clamp nut 9a whereby the upper end of the plate 8 is secured to said reduced end of the spindle 4.

The other end of the spindle 4 has an external annular groove 10 therearound thus forming an external annular flange 11 on this end of the spindle.

The upper end of the plate 9 has an inside, arcuate, dovetailed groove 12 therein whose inner end is semi-circular in shape and whose outer end extends to the margin of said plate.

The flange 11 dovetails into said groove 12.

The corresponding outer end of the spindle 4 is provided with a shallow circular recess 13 and the facing side of the plate 9 is provided with a similar circular recess 14 which registers with the recess 13, when the side plate 9 is in active position.

There is a locking screw 15 which is threaded through the plate 9 and whose outer end is reduced and blank and whose inner end is formed with an enlarged circular head 16 which works in the recesses 13 and 14.

When the screw 15 is screwed inwardly the head 16 will seat in the recess 13 so as to lock the plate 9 against detachment from the spindle 4 but when the screw 15 is screwed outwardly until the head 16 seats in the recess 14 said head will clear the end of the spindle 4 so that the upper end of the plate 9 may be moved, or swung, laterally to release it from the spindle, the corresponding end of the spindle passing through the groove 12.

Between the lower ends of the plate 8 and 9 there is a conventional type of sheave 17 which is mounted to rotate on a spindle 18 whose ends are reduced and extend through said plates and are outwardly threaded to receive similar securing nuts 19, 19.

When the side plate 9 is released from the spindle 4, as hereinabove referred to, said side plate will swing about the axis of the spindle 18 and the loop of a cable may then be readily applied to, or removed from, the sheave 17.

The spindle 4, even when locked against detachment from the plate 9, is still rotatable relative thereto.

Referring to the form shown in Figures 3 and 4, the numeral 1a designates the hook having a shank 2a which is mounted to swivel in the cross bar of a clevis 20 and is secured thereto by means similar to the means shown for securing the hook 1 to the spindle 4.

The arms of the clevis 20 have aligned, transverse, bearings 21, 21 to receive the spindle 4a.

There are similar side plates 8a, 8a, and the ends of spindle 4a are formed with external annular grooves 10a, 10a thus forming external annular, end flanges 11a, 11a and said ends project out beyond the corresponding clevis arms and into inside, arcuate, dovetailed grooves 12a, 12a in said side plates. The inner ends of these grooves are arcuate in shape, as shown in Figure 3, and form bearings for the spindle ends, and the flanges 11a dovetail into the corresponding grooves 10a.

The ends of the spindle 4a are provided with shallow circular recesses 13a, 13a and the facing sides of the plates 8a, 8a, are provided with similar circular recesses 14a, 14a which register with recesses 13a when the side plates are in active position.

There are the locking screws 15a, 15a which are threaded through the plates 8a and whose outer ends are reduced and blank and whose inner ends are formed with enlarged circular heads 16a which work in the recesses 13a and 14a.

When the screws 15a are screwed inwardly the corresponding heads 16a will seat in the recesses 14a so as to lock the plates 8a against detachment from the spindle 4a but when either screw 15a is screwed outwardly until its head 16a seats in the corresponding recess 14a said head will clear the corresponding end of the spindle 4a so that the upper end of the corresponding plate 8a may be moved, or swung, laterally to release it from the spindle, the corresponding end of the spindle passing through its groove 12a.

The spindle 4a, even when locked against detachment from the plates 8a, 8a, is still rotatable relative thereto. The sheaves are designated by the numerals 17a, 17a and they may be mounted to rotate on a suitable spindle 18a which passes through the side plates 8a and is secured in place by the end nuts 19a, 19a.

The sheaves 17a may be separated by means of a web, or plate 22 whose upper end has a bearing 23 on the spindle 4a and whose lower end has a bearing to receive the spindle 18a. When a side plate is released from its end of the spindle 4a, as hereinabove referred to, said side plate will swing about the axis of the spindle 18a and the loop of a cable may then be readily applied to, or removed from, the corresponding sheave 17a.

In order that a plate 8a may swing clear of the corresponding end of the spindle 4a, the groove 12a of said plate extends to the margin of said plate as shown in Figures 3 and 5.

Secured on the outer end of the screw 15 there is a grip member 24 and secured on the outer ends of the screws 15a, 15a are the grip members 24a. These grip members may be secured on their respective screws in any approved manner. As shown, they are pinned thereon. They may be used in running the screws outwardly to inactive position or inwardly to active position.

As will be noted from an inspection of Figures 2 and 3 the lower ends of these grip members are extended downwardly thus forming weights which will prevent their rotation due to the vibration to which the block may be subjected and the inadvertent unscrewing of the corresponding screw to inactive position.

The drawings and description are illustrative merely while the broad principle of the invention will be defined by the appended claim.

What I claim is:

A snatch block comprising, a supporting hook having a shank spaced from the free end of said hook, a supporting spindle having a vertical bearing through which said shank rotates on a vertical axis, a pair of side plates suspended from the ends of said spindle, one end of said spindle having an external annular groove therearound to form an external annular flange, the corresponding side plate having an inside, dovetailed, groove formed therein, the inner end of same being semi-circular in shape and the outer end thereof extending to the margin of said plate, said groove being so formed so that the flange may dovetail into it, said spindle having an end recess concentric with the spindle axis and the facing side of said side plate being provided with a similar recess which registers with the recess in the spindle when said side plate is in active position, a retainer on the plate movable into the recess in the end of the spindle to retain said flange in said dovetailed groove in the corresponding side plate, said retainer being movable into inactive position to allow lateral movement of the plate and spindle to permit displacement of the spindle end from the groove, a grip member on the outer end of the retainer whereby it may be turned, said grip member having an extension forming a weight, and a sheave mounted to rotate between said plates.

O. MAGNUS BERG.

REFERENCES CITED

The following references are of record in the file of this patent:

UNITED STATES PATENTS

| Number | Name | Date |
| --- | --- | --- |
| 1,122,545 | Smith | Dec. 29, 1914 |
| 2,374,118 | Moore | Apr. 17, 1945 |

FOREIGN PATENTS

| Number | Country | Date |
| --- | --- | --- |
| 2,711 | Sweden | Mar. 28, 1891 |